United States Patent [19]

Broussard

[11] Patent Number: 4,694,547

[45] Date of Patent: Sep. 22, 1987

[54] ONE-PIECE METAL COVERING FOR INSULATED PIPE BENDS

[76] Inventor: Edison L. Broussard, 13327 Virgil Jackson, Baton Rouge, La. 70818-2050

[21] Appl. No.: 828,443

[22] Filed: Feb. 6, 1986

Related U.S. Application Data

[63] Continuation-in-part of Ser. No. 583,603, Feb. 27, 1984, abandoned.

[51] Int. Cl.⁴ .................. B21D 53/00; F22B 7/18; F16L 43/00
[52] U.S. Cl. .................. 29/157 R; 29/33 E; 29/526 R; 122/163; 122/164; 138/118.1; 138/149; 138/156; 138/177; 138/DIG. 11; 285/47; 285/183
[58] Field of Search ............... 29/157 R, 33 E, 526 R; 122/163, 164; 138/118.1, 148, 149, 156, 178, 177, DIG. 11; 220/445, 469; 285/47, 183, 184, 185

[56] References Cited

U.S. PATENT DOCUMENTS

| | | | |
|---|---|---|---|
| 119,621 | 10/1871 | Leas et al. | 29/526 R |
| 149,975 | 4/1874 | Beckmann et al. | 285/183 |
| 164,872 | 6/1875 | Piehl | 285/183 |
| 296,786 | 4/1884 | Rock | 285/183 |
| 882,238 | 3/1908 | Dieckmann | 285/183 |
| 926,423 | 6/1909 | Kelly | 138/140 |
| 2,390,632 | 12/1945 | Abrams et al. | 285/47 |
| 3,153,546 | 10/1964 | Dunn | 138/149 X |
| 4,022,248 | 5/1977 | Hepner et al. | 138/141 |
| 4,327,778 | 5/1982 | Williams | 138/149 |

OTHER PUBLICATIONS

Childers Products Company of Beachwood, Ohio; Technical Product Information Brochure EJAE-1179, and GEJ-479, copyrighted in 1977 and 1976, respectively, entitled "ELL-JACS ® Aluminum Elbows" and GORE ELL-JACS ® Aluminum Elbows, respectively.

Primary Examiner—Howard N. Goldberg
Assistant Examiner—Ronald S. Wallace
Attorney, Agent, or Firm—James M. Pelton

[57] ABSTRACT

An improved one-piece metal jacket for insulated pipe elbows, bends and/or turns having a central metal spine spaced apart along which a plurality of opposed pairs of metal fingers extend sufficiently to overlap, longitudinally and traversely forming a weatherproof covering and fasteners to hold the fingers in place.

34 Claims, 7 Drawing Figures

ONE-PIECE METAL COVERING FOR INSULATED PIPE BENDS

CROSS-REFERENCE TO RELATED APPLICATION

This application is a continuation-in-part of application Ser. No. 583,603, filed Feb. 27, 1984 now abandoned.

BACKGROUND OF THE INVENTION

This invention relates to the field of coverings for insulated pipe. More particularly, this invention relates to metal coverings, commonly called lagging, for insulated pipe bends or turns.

The insulation of pipe and pipelines in industrial, commercial or residential facilities is important for energy conservation, freeze protection, personnel protection, better process control and pipe protection. Normal specifications for the insulation of hot and/or cold piping requires the installation of a calcium silicate, fiberglass, cellular glass, polyurethane, or other similar insulation material, with this insulation being preserved and protected by a metal jacket. To insulate a piece of pipeline, two formed pieces of insulation from 1 to 2 inches or more in thickness, as desired, each covering one-half of the pipe, are wired together and a thin metal jacket is placed over the insulation to protect the insulation from physical abuse and to weatherproof it. The difficulty in jacketing insulated pipe comes at turns and bends, such as elbows of 90° or bends of greater or lesser angles, for instance, 45° bends, in both long and short radius turns.

As far as is known, the insulating industry presently employs pressed fittings for insulated elbows from ½" to 12" I.P.S. (iron pipe size) with a total pipe and insulation O.D. (outside diameter) of 17" and smaller, and "gore" type ells for all larger size bends. The pressed fittings are made in two precision formed matching halves by press molding a piece of sheet metal in the desired size mold to obtain a half elbow. For example, a sheet of aluminum 0.24" thick is laid over the female mold half and the male mold half is pressed into the cavity forming a half elbow approximately 0.016" thick. Two halves are placed over the insulation at the turn and are held in place while sheet metal screws join the halves together along both the inside and outside seams. This procedure suffers from the disadvantages of requiring the use of temporary fasteners to hold it in place, many additional fasteners for permanent securement, putting a seam along the outside bend which is the most vulnerable point of weatherproofing and is expensive and inconvenient in shipping and storage.

For the larger pipe sizes, a "gore" type jacket is either laid out in the field or manufactured in segments to cover and weatherproof the insulation. In "gore" type jacketing, strips of sheet metal are cut out which are wider at their center sections and narrower toward the ends with a slight outward flaring at the ends and are successively wrapped around the insulated pipe bend and fastened together at the inside bend where the two ends meet, usually by a sheet metal screw, until the bend is covered. These "gore" type strips must be temporarily secured so that after the installation of the numerous strips, each strip can be adjusted to provide the necessary watershed capabilities prior to the permanent securement of the strips. The circumferential joints between strips are caulked with a weatherproofing material. The cutting (in manufacture or field layout) of strips for "gore" type jacketing elbows and fastening of individual strips requires more labor and, thus, the cost of such installations is more than 3 times that of pressed fittings for similar size insulated pipe and is the only known method for jacketing pipe and insulation having O.D. measurements over 17".

In my previously filed application, there is described a one-piece metal jacket for insulated pipe bends having a curved metal spine longitudinally covering the curved portion of the insulated pipe bend having the largest radius, and having extending transversely from the metal spine a plurality of opposed paired ribs or fingers of a width such that they are immediately adjacent to each other and tapering outwardly from the spine in a manner to cover the insulated pipe and slightly overlap adjacent ribs or fingers in weatherproofing fashion, the ribs or fingers extending from the metal spine around the insulated pipe and each rib or finger having sufficient length to meet and overlap the end of its paired counterpart, meeting at the curved portion of the insulated bend having the shortest radius, with means such as mechanical fasteners to hold the ends together. Although such one-piece metal jackets are far superior to the previously known multi-piece metal jackets, it is always desirable to make improvements in design or installation or fitness for use. The present invention provides better weatherproofing at the jointure of the metal spine and the fingers, provides improved overlapping along the sides of adjacent fingers and provides better variability for joining the ends of oppositely paired fingers.

SUMMARY OF THE INVENTION

The present invention provides an improved one-piece metal jacket for insulated pipe bends comprising:

(a) a curved metal spine for longitudinally covering the curved portion of the insulated pipe bend having the larger radius, (b) a plurality of opposed paired fingers, spaced apart along and extending from said spine, having sufficient length to overlap longitudinally and transversely around said insulated pipe, and (c) fastener means to hold said fingers in fixed position, whereby the portion of said spine between adjacent, spaced apart opposed pairs of said fingers forms a connecting link such that when said connecting link is folded back upon the metal spine, the adjacent pair of opposed fingers overlap along their sides in weatherproofing fashion.

Another aspect of my present invention provides a metal blank or metal pattern suitable for rolling and applying to an insulated pipe bend or turn to form a weatherproof one-piece metal jacket. The metal blank comprises a flat metal sheet having a flat central solid spine with opposed pairs of metal fingers extending outwardly therefrom, each of the metal fingers being relatively wide at its base near the spine and tapering in a smooth curve to relatively narrow ends. The blank is produced from a relatively thin flat metal sheet and is suitable for rolling into a cylindrical tube and applying the cylindrical tube to an insulated pipe bend and securing it thereon. A still further aspect of my invention includes the rolled metal blank for one-piece metal jacket for applying to pipe bends in which a straight metal spine has opposed pairs of metal fingers extending therefrom and spaced apart from each other along said metal spine, each of said metal fingers being relatively wide at its base and converging in a smooth curve to a relatively narrow end, the spine and fingers forming a cylindrical tube suitable for applying and securing to an insulated pipe bend.

A still further aspect of my invention provides a method of covering an insulated pipe bend with a one-piece metal jacket by applying a rolled metal blank for a onepiece metal jacket having a straight metal spine with opposed pairs of metal fingers extending therefrom and forming a cylindrical tube suitable for applying and securing to an insulated pipe bend.

DESCRIPTION OF THE DRAWINGS

One skilled in the field of insulating and lagging pipelines will be able to understand my improvements more easily by reference to the attached drawings which are illustrative of my invention. In the figures of the drawings, like numbers refer to like parts. As shown in the drawings.

DETAILED DESCRIPTION OF THE INVENTION

Figure 1:
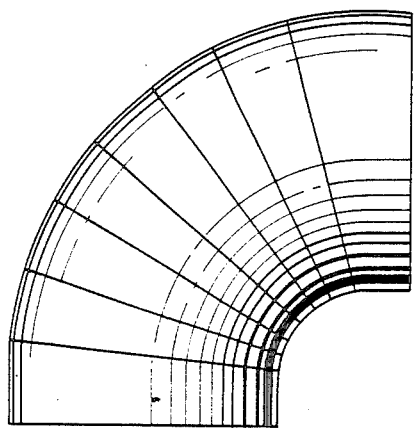
FIGS. 1 and 2 are an illustration of the invention disclosed in my previously filed application and show a side and front elevational view of a one-piece metal jacket without spaced apart fingers.
Figure 2:
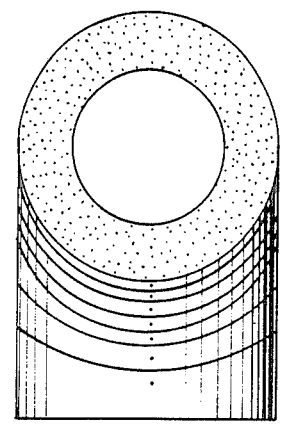
Figure 3:
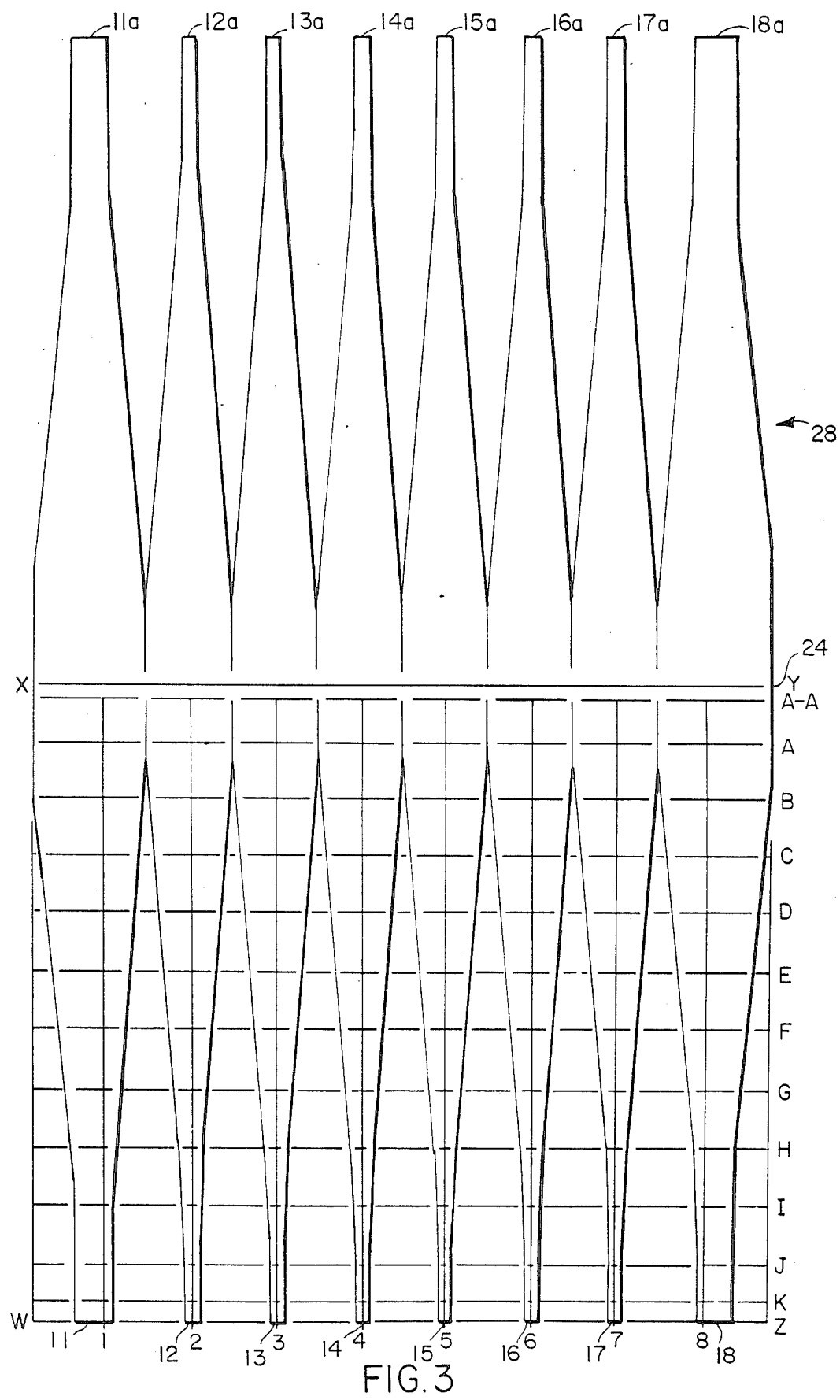
FIG. 3 shows a top plan view of a flat metal blank used to make the one-piece metal jacket of my previous invention for comparative purposes in which a grid reference of letters and numbers identifies the two halves of the blank.

As seen in FIGS. 1, 2 and 3, the one-piece metal jacket of my previous application, which is incorporated herein by reference, has fingers which form a sharp intersection near the metal spine. This feature, while permitting easy bending, nevertheless does not permit complete overlap and as good a weatherproofing as could be obtained with the one-piece metal jacket of my present invention.

Figure 4:
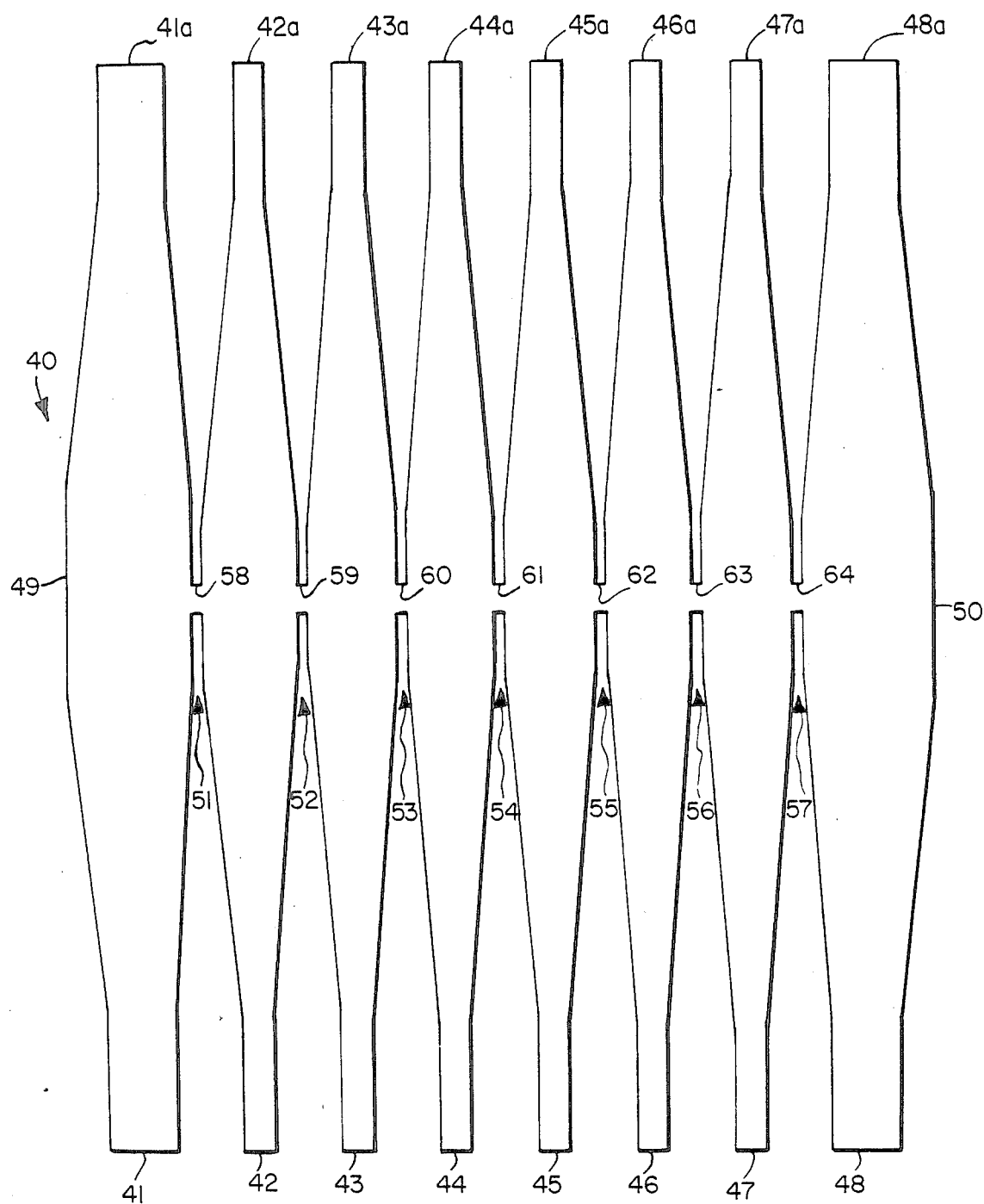
FIG. 4 illustrates a top plan view of my present invention which is a flat metal jacket pattern or blank having spaced apart fingers as manufactured.

FIG. 4 is illustrative of one aspect of my improved invention which, when compared with FIG. 3, shows the nature of my present invention. As shown in FIG. 4, the flat metal blank 40 has metal fingers 41, 42, 43, 44, 45, 46, 47 and 48, although their number is non-limiting, which begin at metal spine 49-50 and generally taper or converge to a more narrow end. The intersections of each of the metal fingers 41 through 48 with metal spine 49-50 have spaces 51, 52, 53, 54, 55, 56 and 57. Metal fingers 41 and 48 are wider at their distal ends so that in use they can overlap adjacent straight runs of metal jacketing in the insulated pipe. Connecting links 58, 59, 60, 61, 62, 63 and 64 lie along and are a part of metal spine 49-50 and serve as connections between the metal fingers so that connecting links 58 through 64 can be folded back over one opposed pair of fingers and under the adjacent opposed pair of fingers, such as 41 and 42, to provide sufficient overlap along the tapered sides of the metal fingers and, in addition, at the metal spine to provide better weatherproofing at the juncture of the fingers and the spine than previously available in any one-piece metal jacket for insulated pipe bends.

Figure 5:
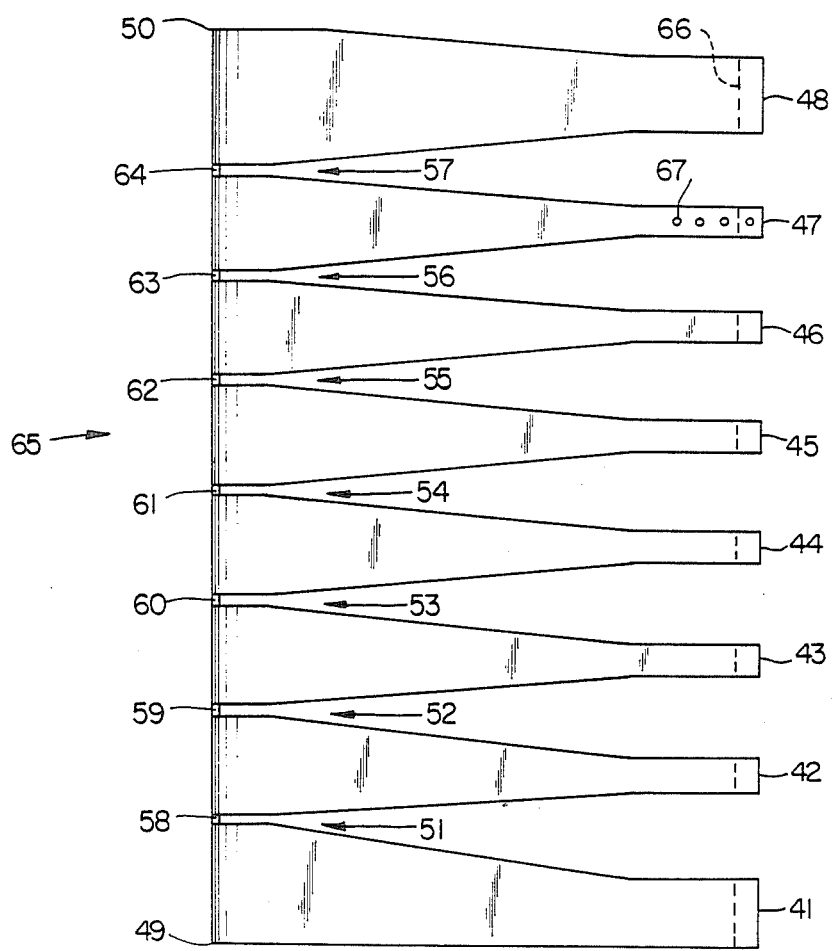
FIG. 5 represents a side view of a rolled metal blank of my present invention ready for application to an insulated pipe bend.
Figure 6:
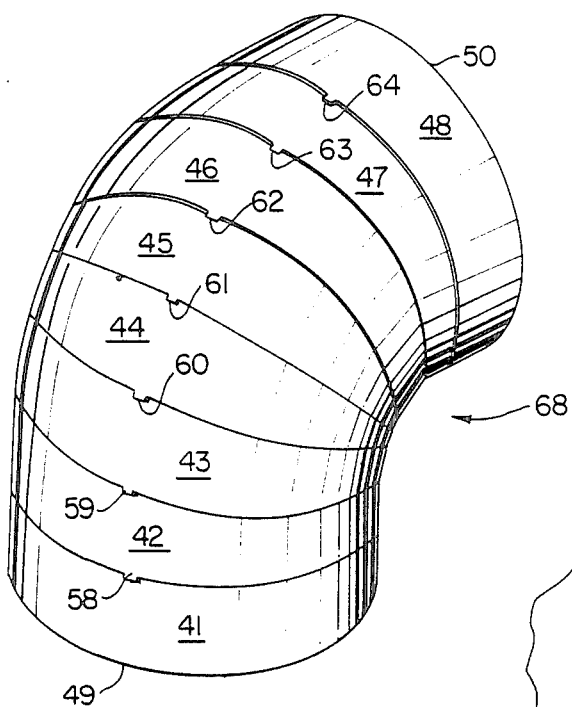
FIG. 6 illustrates the improved one-piece metal jacket of my present invention in place on a bend of a piece of insulated pipe.

As shown in FIG. 5, a one-piece rolled metal blank 65 is a preliminary stage for the one-piece metal jacket 68, shown in FIG. 6 of this invention. One-piece rolled metal blank 65 has metal spine 49-50 which is straight and metal fingers 41, 42, 43, 44, 45, 46, 47 and 48 which are curved convexly toward concavely curved metal fingers 41a through 48a, respectively, not shown. At the end portion of metal fingers 41-48 or 41a-48a are means to hold the corresponding closed fingers, i.e., 41 and 41a, for example, together. For purposes of illustration, one or both ends of the fingers can have conventionally known metal adhesive strip 66 covered with conventional easily released paper which can be peeled off and the overlapping ends temporarily adhesively secured until fixed with permanent fasteners, not shown, such as metal screws, in holes 67. FIG. 5 shows, for illustrative purposes only, finger 47 having several holes for adjustably fastening the fingers together using a sheet metal screw. Of course, similar holes would be placed in each of the opposed pairs of metal fingers 41-48 and 41a-48a.

The rolled metal blank 65 is prepared by rolling a flat one-piece metal blank 40 for one-piece metal jacket 68 for insulated pipe bends or turns in a conventional rolling machine presently used and readily available in the insulation jacketing industry.

The one-piece flat metal blank 40 of this invention can be constructed by preparation of a pattern generally in accord with FIG. 4, laying the pattern out on the flat sheet metal and cutting out by hand or machine the flat metal blank. It is clearly preferable to use automated machinery, for example, laser cutting equipment, to cut out more than one of the blanks at the same time. The one-piece flat metal blank can be shipped as such and then on the jobsite roll-formed into a one-piece rolled metal blank 65 and thereafter applied to the pipe bend. While temporarily fastening the first opposed pair of metal fingers at one end of said one-piece rolled metal blank, the connecting link is bent back upon the metal spine and folding the next adjacent pair of metal fingers about said insulated pipe bend in overlapping and weatherproofing fashion and temporarily fastening. This procedure is continued until the last pair of opposed metal fingers is folded about said insulated pipe bend, connecting link bent, fingers temporarily secured and thereafter securely fastening each of said metal fingers together.

Figure 7:
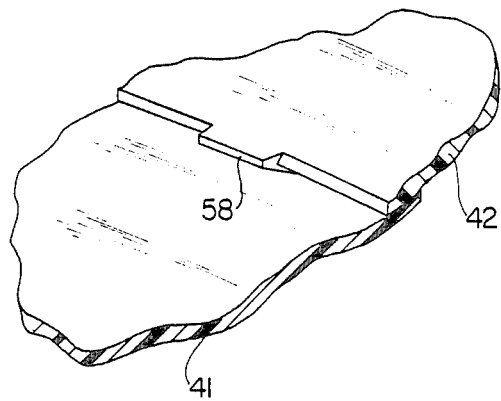
FIG. 7 is a partial detail view of the lap seam or overlapping portion of the one-piece metal jacket of my present invention.

As shown in FIG. 6, the one-piece metal jacket for insulated pipe bends is depicted in place as it appears having fingers 41-48 attached and securely fastened with connecting links bent back along connecting links 58-64 along metal spine 49-60 bent back as more clearly illustrated in FIG. 7.

Although the Figures of the drawings illustrate 90° ells, the present invention contemplates one-piece flat metal blanks, rolled metal blanks and one-piece metal jackets for 45° bends, for short and long radius bends, turns and sweeps of all angles and radii.

Thus, in contrast to pressed two-piece metal jackets, the present invention not only provides an efficient inexpensive weatherproofed one-piece metal jacket for all insulated bends with diameters of up to 17", but also provides this same type of one-piece metal jacket for insulated metal bends of greater than 17" in diameter, fulfilling the need for such product for these larger insulated pipe sizes. The one-piece metal jacket of the present invention eliminates the need for time-consuming fabrication and expensive installation cost of the "gore" type construction which has always been required due to the lack of a pressed, two-piece metal jacket for larger insulated pipe bends and further provides more snugly weatherproofed one-piece metal jacket having continuously overlapping and weatherproofing for all of the fingers about the circumference of the metal pipe bend and eliminating problems with the possibility of leakage at the jointure of the metal fingers with the spine.

Having described the various embodiments of this invention illustratively, those skilled in the art would readily envision various changes and modifications within the spirit and scope of the present invention, therefore, it is desired that the present invention be limited only by the lawful scope of the following claims.

What is claimed is:

1. A one-piece metal jacket for insulated pipe bends comprising:
   (a) a curved metal spine for longitudinally covering the curved portion of the insulated pipe bend having the larger radius,
   (b) a plurality of opposed paired fingers, spaced apart along and extending from said spine, having sufficient length to overlap longitudinally and transversely around the insulated pipe,
   (c) a plurality of connecting links formed along said spine and between the spaced apart fingers, separating one pair of said opposed paired fingers from another pair, and
   (d) fastener means to hold said fingers in fixed position, whereby the portion of said spine between adjacent, spaced apart opposed pairs of fingers and forming said connecting link, in use, folds back upon said spine overlapping the next adjacent pair of opposed fingers along their sides in weatherproofing fashion.

2. The one-piece metal jacket of claim 1 in which said curved metal spine is made from flat sheet metal.

3. The one-piece metal jacket of claim 1 in which said opposed pairs of interior metal fingers are identical.

4. The one-piece metal jacket of claim 1 in which said metal fingers are made from flat sheet metal.

5. The one-piece metal jacket of claim 4 in which said metal fingers are relatively wide at their base.

6. The one-piece metal jacket of claim 5 in which each of said metal fingers smoothly curve in a taper to a relatively narrow end.

7. The one-piece metal jacket of claim 1 in which said metal is aluminum.

8. The one-piece metal jacket of claim 1 in which said metal is steel.

9. The one-piece metal jacket of claim 8 in which said steel is stainless steel.

10. The one-piece metal jacket of claim 3 in which the opposed pair of metal fingers at each end of said metal spine has a width sufficient to overlap the end of an adjacent straight section of metal jacketing.

11. A rolled metal blank for a one-piece metal jacket for insulated pipe bends according to claim 1 which comprises a straight metal spine with opposed pairs of metal fingers extending therefrom, each of said metal fingers being relatively wide at its base and spaced apart from each other along said metal spine, and tapering in a smooth curve to their ends such that gaps are provided between the ends of adjacent fingers, a connecting link formed along said spine and between each of the spaced apart fingers separating one pair of said opposed pairs of metal fingers from another pair, said spine and fingers forming a cylindrical tube suitable for applying and securing to an insulated pipe bend as a one-piece metal jacket for insulated pipe bends.

12. A flat metal blank for a one-piece metal jacket for insulated pipe bends according to claim 1 comprising a metal spine with opposed pairs of metal fingers extending therefrom, each of said metal fingers being relatively wide at its base and tapering in a smooth curve to relatively narrow ends, a connecting link formed along said spine and between each of the spaced apart fingers separating one pair of said opposed paired fingers from another pair, said blank being produced from a relatively thin flat metal sheet and suitable for rolling into a cylindrical tube which is suitable for applying and securing to any insulated pipe bend.

13. The one-piece metal jacket of claim 12 in which said curved metal spine is made from flat sheet metal.

14. The one-piece metal jacket of claim 12 in which said opposed pairs of interior metal fingers are identical.

15. The one-piece metal jacket of claim 12 in which said metal fingers are made from flat sheet metal.

16. The one-piece metal jacket of claim 15 in which said metal fingers are relatively wide at their base.

17. The one-piece metal jacket of claim 16 in which each of said metal fingers smoothly curve in a taper to a relatively narrow end.

18. The one-piece metal jacket of claim 12 in which said metal is aluminum.

19. The one-piece metal jacket of claim 12 in which said metal is steel.

20. The one-piece metal jacket of claim 19 in which said steel is stainless steel.

21. The one-piece metal jacket of claim 14 in which the opposed pair of metal fingers at each end of said metal spine has a width sufficient to overlap the end of an adjacent straight section of metal jacketing.

22. A method of covering an insulated pipe bend which comprises applying the one-piece metal jacket of claim 1 to said bend, temporarily fastening the first opposed pair of metal fingers at one end and then bending the connecting link back upon the metal spine and folding the next adjacent pair of metal fingers about said insulated pipe bend in overlapping and weatherproofing fashion continuing until the last pair of metal fingers is folded and secured temporarily and thereafter securely fastening each of said metal fingers.

23. The method of claim 22 in which said curved metal spine is made from flat sheet metal.

24. The method of claim 22 in which said opposed pairs of interior metal fingers are identical.

25. The method of claim 22 in which said metal fingers are made from flat sheet metal.

26. The method of claim 25 in which said metal fingers are relatively wide at their base.

27. The method of claim 26 in which each of said metal fingers smoothly curve in a taper to a relatively narrow end.

28. The method of claim 22 in which said metal is aluminum.

29. The method of claim 22 in which said metal is steel.

30. The method of claim 29 in which said steel is stainless steel.

31. The method of claim 24 in which the opposed pair of metal fingers at each end of said metal spine has a width sufficient to overlap the end of an adjacent straight section of metal jacketing.

32. The method of claim 24 wherein said fingers are fastened together a sheet metal screw.

33. The method of claim 22 in which said metal is aluminum.

34. The method of claim 22 in which said metal is stainless steel.

* * * * *